United States Patent
Holl et al.

(10) Patent No.: US 12,325,290 B2
(45) Date of Patent: Jun. 10, 2025

(54) AIR FILTER MONITORING SYSTEM AND METHOD FOR A WORK MACHINE

(71) Applicant: Deere & Company, Moline, IL (US)

(72) Inventors: Kyle A. Holl, Durango, IA (US); Scott J. Breiner, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 782 days.

(21) Appl. No.: 17/643,886

(22) Filed: Dec. 13, 2021

(65) Prior Publication Data
US 2023/0182545 A1    Jun. 15, 2023

(51) Int. Cl.
*B60H 3/06* (2006.01)
*B60H 1/00* (2006.01)

(52) U.S. Cl.
CPC ....... *B60H 3/0608* (2013.01); *B60H 1/00378* (2013.01); *B60H 1/00828* (2013.01); *B60H 1/00985* (2013.01); *B60H 2003/0683* (2013.01)

(58) Field of Classification Search
CPC ............ B60H 1/00985; B60H 1/00378; B60H 1/00828; B60H 3/0608; B60H 2003/0683
See application file for complete search history.

(56) References Cited

U.S. PATENT DOCUMENTS

| | | | | |
|---|---|---|---|---|
| 4,531,453 A | * | 7/1985 | Warman | B60H 1/00378 55/330 |
| 8,056,617 B2 | * | 11/2011 | Klassen | B60H 1/00828 454/75 |
| 11,772,027 B2 | * | 10/2023 | Kim | B01D 53/0407 96/405 |
| 2012/0319851 A1 | * | 12/2012 | Hoglund | F24F 11/30 340/607 |
| 2023/0272799 A1 | * | 8/2023 | Brisenheim | F24F 11/77 417/423.7 |

\* cited by examiner

*Primary Examiner* — Allen R. B. Schult

(57) ABSTRACT

An air filter monitoring system and method includes a plenum, a pressurization blower, a first motor driving the pressurization blower, a first motor current sensor, a recirculation blower, a second motor driving the recirculation blower, a second motor current sensor, a speed selector, a fresh air filter, a recirculation air filter, a pressurization blower speed sensor, a recirculation blower speed sensor, and a non-transitory computer readable medium comprising a program instruction for permitting a controller to monitor the HVAC system. The program instruction is adapted to produce a first and a second motor control signal to drive independently the pressurization blower and the recirculation blower, respectively. The first and second motor control signals are a function of the speed sensor signals to maintain a constant speed. Comparing a first and second motor current sensor signal to a baseline and triggers a replacement action when either signal falls below a threshold.

20 Claims, 3 Drawing Sheets

AIR FILTER MONITORING SYSTEM AND METHOD FOR A WORK MACHINE

CROSS-REFERENCE TO RELATED APPLICATIONS

Field of the Disclosure

The present disclosure relates to an air filter monitoring system and method for a work machine.

BACKGROUND

Work machines operate in variable environmental conditions with a range of pollutants in the air. This may impact the air filter pressure drop and life; cost of the filter including installation and disposal depending on a remaining useful life; the impact of the filter on the compressor degradation and heat rate; engine configuration, duty cycle, and economic value. Work machine HVAC systems operate with two separate air filters, a fresh air filter and a recirculation air filter to condition air within a confined space such as the operator cabin. The use of two air filters, with two respective blowers, is relatively unique to construction, forestry, and agricultural machines. These air filters are generally assigned a fixed interval for replacement based on a predetermined time, or number of hours of use. However, the rate of filter replacement can vary based on the condition of the environment the work machines operate in. Therein lies an opportunity to reduce work machine downtime by automatically identifying which filter may need replacement and assessing the condition of the air filter on a more granular level at any point in time.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure relates to an air filter monitoring system and method for a work machine.

According to an aspect of the present disclosure, the work machine includes a prime mover with a cab including an air filter monitoring system. The air filter monitoring system includes a plenum, a pressurization blower, a first motor for driving the pressurization blower, a first motor current sensor, a recirculation blower, a second motor for driving the recirculation blower, a second motor current sensor, a speed selector, a fresh air filter, and a recirculation air filter. The plenum includes a fresh air intake through which fresh air is drawn into the plenum. The plenum also includes a recirculation air intake through which air is drawn from the cab into the plenum, and an outlet through which air is exhausted into the cab. The pressurization blower is located between the fresh air intake and the outlet for causing airflow from the fresh air intake to the outlet. The first motor drives the pressurization blower as a function of the first motor control signal. The first motor current sensor measures the first current to maintain the first motor speed and provides a first motor current sensor signal indicative of the first current. The recirculation blower is located between the recirculation air intake and the outlet for causing airflow from the recirculation air intake to the outlet. The second motor drives the recirculation blower as a function of a second motor control signal. The second motor current sensor measures a second current to maintain the second motor speed. The second motor current sensor provides a second motor current sensor signal indicative of the second current. The speed selector provides the speed select signal. The fresh air filter is for filtering airflow from the fresh air intake to the pressurization blower. The recirculation air filter is for filtering cabin air flowing from the recirculation air intake to the outlet.

A pressurization blower speed sensor provides a first speed sensor signal indicative of the speed of the pressurization blower wherein the speed of the pressurization blower varies as a function of the airflow from the pressurization blower. The recirculation blower speed sensor provides a second speed signal indicative of the speed of the recirculation blower, wherein the speed of the recirculation blower varies as a function of the speed select signal.

The air filter monitoring system further comprises a non-transitory computer readable medium comprising a program instruction for permitting a controller to monitor the HVAC system. The program instruction, when executed, causes a processor of the controller to do the following. In a first step, the program instructions include producing a first and a second motor control signal to drive the pressurization blower and the recirculation blower independently of one another. The first motor control signal is a function of the first speed sensor signal to maintain a constant speed from the pressurization blower to the outlet despite changes in the condition of the fresh air filter. The second motor control signal is a function of the speed select signal to maintain a constant speed from the recirculation blower to the outlet despite changes in the condition of the recirculation air filter. The program instructions also include monitoring the first motor current sensor signal and the second motor control current sensor signal, comparing the first motor current sensor signal to a first baseline motor current sensor signal, comparing the second motor current sensor signal to a second baseline motor current sensor signal and triggering a filter replacement action identifying the filter requiring replacement when the first motor current sensor signal falls below a first threshold value of the first baseline motor current sensor signal or the second motor current sensor signal falls below a second threshold value of the second baseline motor current sensor signal. The second threshold value may depend on the speed select signal. The second threshold value may further depend on a property of air in the plenum. The first threshold value may depend on a property of fresh air.

The filter replacement action may comprise a display of one or more of a display of a remaining useful life, a filter replacement notification, and a prime mover derate. The remaining useful life may be based on a recording of prior measurements of baseline threshold values and timings of air filter replacements.

In another aspect of the air filter monitoring system, the first baseline motor current sensor signal is recalibrated when the fresh air filter is replaced, and the second baseline motor current sensor signal is recalibrated when the recirculation air filter is replaced.

The filter replacement action may further comprise adjusting the fresh air filter service interval for the fresh air filter based on the first motor current sensor signal, and the recirculation air filter service interval based on the second motor current sensor signal.

In an alternative embodiment, a filter replacement alert may be triggered when a difference between the first motor current sensor signal and the second motor current sensor signal. The triggering may further help identify which filter requires replacement based on the first motor current sensor signal and the second motor current sensor signal. A filter replacement action may be performed based on the filter replacement alert.

Other features and aspects of the disclosure will become apparent by consideration of the following detailed description and accompanying drawings.

Figure 1:
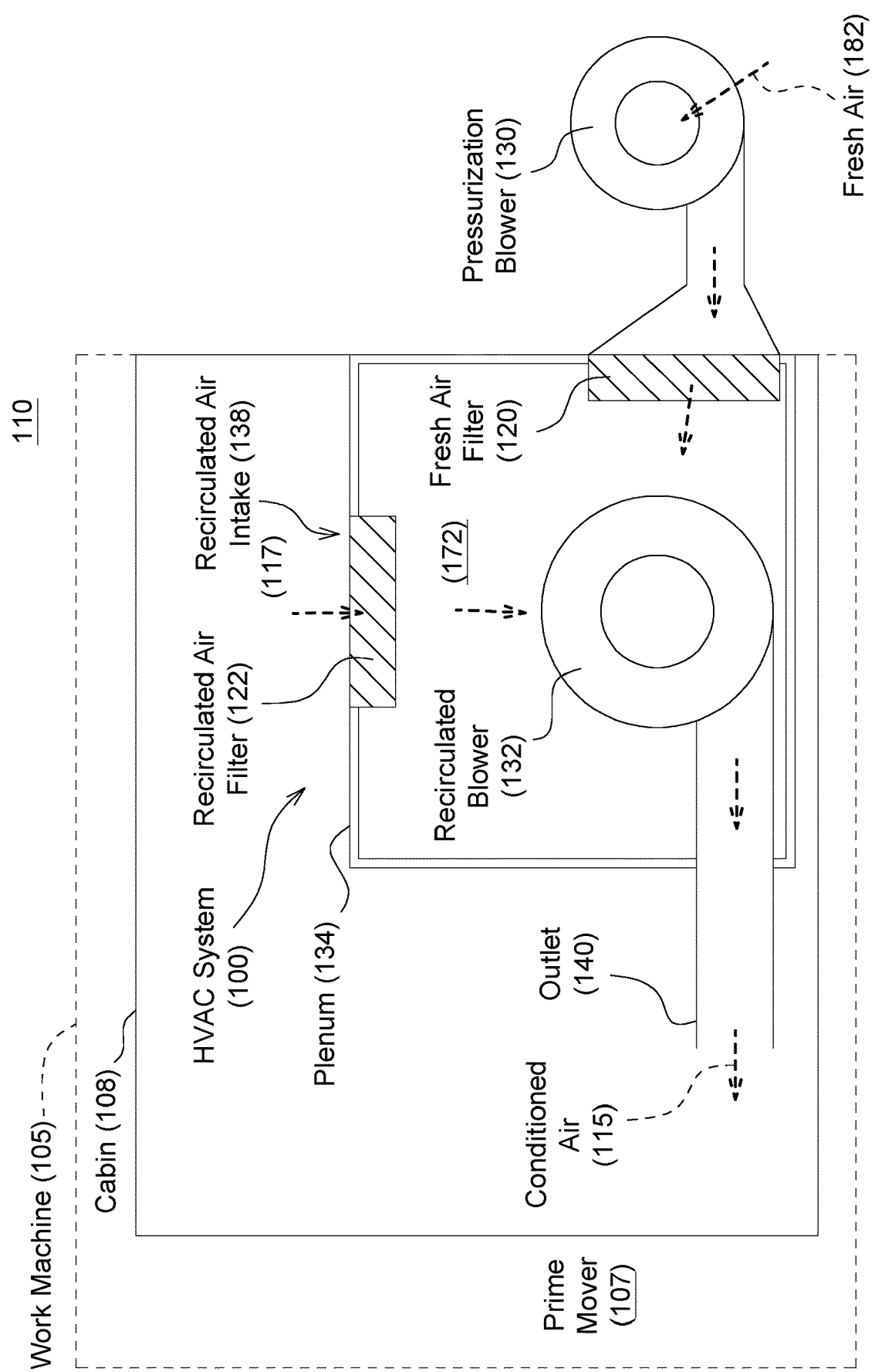
FIG. 1 depicts a schematic view of an embodiment of the HVAC system for a work machine.

Before any embodiments are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

As used herein, unless otherwise limited or modified, lists with elements that are separated by conjunctive terms (e.g., "and") and that are also preceded by the phrase "one or more of" or "one or more of" indicate configurations or arrangements that potentially include individual elements of the list, or any combination thereof. For example, "one or more of A, B, and C" or "one or more of A, B, and C" indicates the possibilities of only A, only B, only C, or any combination of two or more of A, B, and C (e.g., A and B; B and C; A and C; or A, B, and C).

As used herein, the term "controller" is a computing device including a processor and a memory. The "controller" may be a single device or alternatively multiple devices. The controller may further refer to any hardware, software, firmware, electronic control component, processing logic, processing device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

The term "processor" is described and shown as a single processor. However, two or more processors can be used according to particular needs, desires, or particular implementations of the controller and the described functionality. The processor may be a component of the controller, a portion of the object detector, or alternatively a part of another device. Generally, the processor can execute program instructions and can manipulate data to perform the operations of the controller, including operations using algorithms, methods, functions, processes, flows, and procedures as described in the present disclosure.

The present disclosure is directed towards an air filter monitoring system 110 and method for detecting the condition of the air filters, or more specifically a fresh air filter 120 and a recirculation air filter 122, found on the HVAC system 100 of a work machine 105. The cleanliness of the air filters (120, 122) generally refers to the amount of dirt, dust, or any other obstructing materials on or in the air filter. These obstructing materials can progressively block the air filter and curtail the flow of air in the space fed by the HVAC system. The space in a work machine generally refers to a volume of air conditioned mechanically, such the operator cab. Increased resistance to airflow can result in an increased load on the prime mover of the work machine, and wear and tear on the mechanical parts of the HVAC system due to longer operating times. Furthermore, because the quality of the air intake through the fresh air filter 120 and the recirculation air filter 122 will differ, the rate of clogging may depend on the environment the work machine 105 operates in and therefore impact the interval of service required.

FIG. 1 depicts a schematic view of an embodiment of an HVAC system 100 for a work machine. Disclosed embodiments of the air filter monitoring system 110 include software, hardware, and/or firmware arranged to provide real-time indication of the condition of the air filters (120, 122) in the HVAC system 100 using measurement of the current through and voltage across the blowers (130, 132) and/or the motor (142, 146) driving the blowers. A blower may be functional to move air either into or out of a space. In at least one embodiment, the air filter monitoring system 110 includes a motor current sensor to measure current (and alternatively voltage) through and across the motor blowers (142, 146). The air filter monitoring system 110 uses the measured current and/or voltage to generate data or information related to the cleanliness of the air filters (120, 122). The HVAC system 100 of the work machine 105 comprises a plenum 134 having a fresh air intake 136 through which fresh air is drawn into the plenum 134. The system 110 further includes a recirculation air intake 138 through which cab air 117 is drawn from the cab 108 into the plenum 134, and an outlet 140 through which air is exhausted into the cab.

Figure 2:
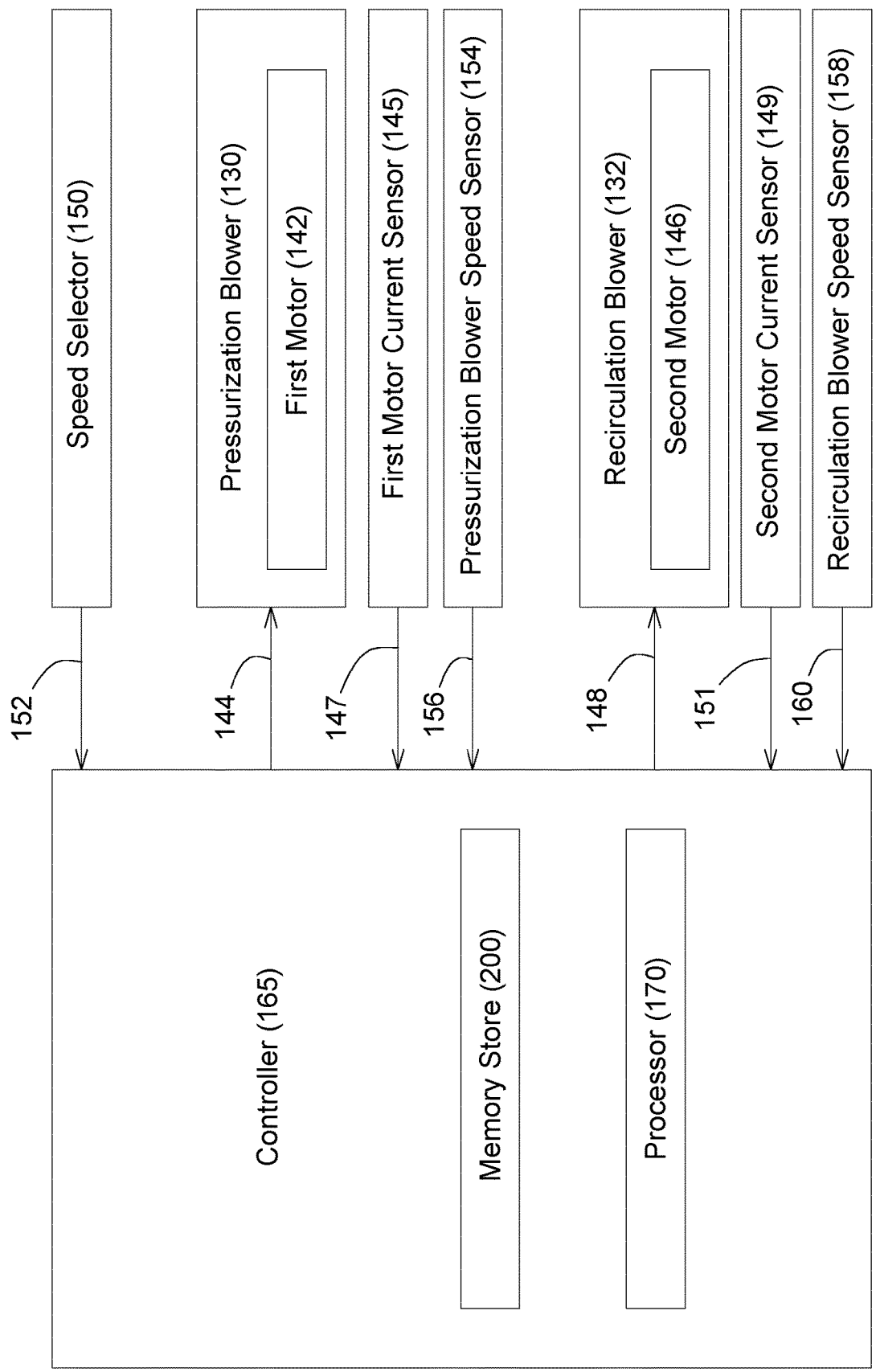
FIG. 2 depicts a schematic view of an embodiment of the air filter monitoring system for the HVAC system in FIG. 1.

FIG. 2 depicts a schematic view of an embodiment of the air filter monitoring system for the HVAC system in FIG. 1. Now turning to FIG. 2 with continued reference to FIG. 1, the pressurization blower 130 is located between the fresh air intake 136 and the outlet 140, causing airflow from the fresh air intake 136 to the outlet 140. A first motor 142 drives the pressurization blower 130 as a function of the first motor control signal 144 at a first motor speed. A first motor current sensor 145 measures a first current required to maintain the first motor speed. The first motor current sensor provides a first motor current sensor signal 147 indicative of the first current.

A recirculation blower 132 located between the recirculation air intake 138 and the outlet 140 causes airflow from the recirculation air intake 138 to the outlet 140. A second motor 146 drives the recirculation blower 132 as a function of a second motor control signal 148 at a second motor speed. The second motor current sensor 149 measures a second current required to maintain the second motor speed. The second motor current sensor 149 provides a second motor current sensor signal 151 indicative of the second current. A speed selector 150 provides a speed select signal 152. The fresh air filter 120 is for filtering air flowing from the fresh air intake 136 to the pressurization blower 130. The recirculation air filter 122 is for filtering air flowing from the recirculation air intake 138 to the outlet 140. A pressurization blower speed sensor 154 provides a first speed sensor signal 156 indicative of a speed of the pressurization blower 130. That is the first speed sensor signal 156 is in either in a current sensing or voltage sensing or amp draw measurement. A recirculation blower speed sensor 158 provides a second speed sensor signal 160 indicative of the speed of the pressurization blower 130, wherein the speed of the recirculation blower 132 varies as a function of the speed select signal 152.

Figure 3:
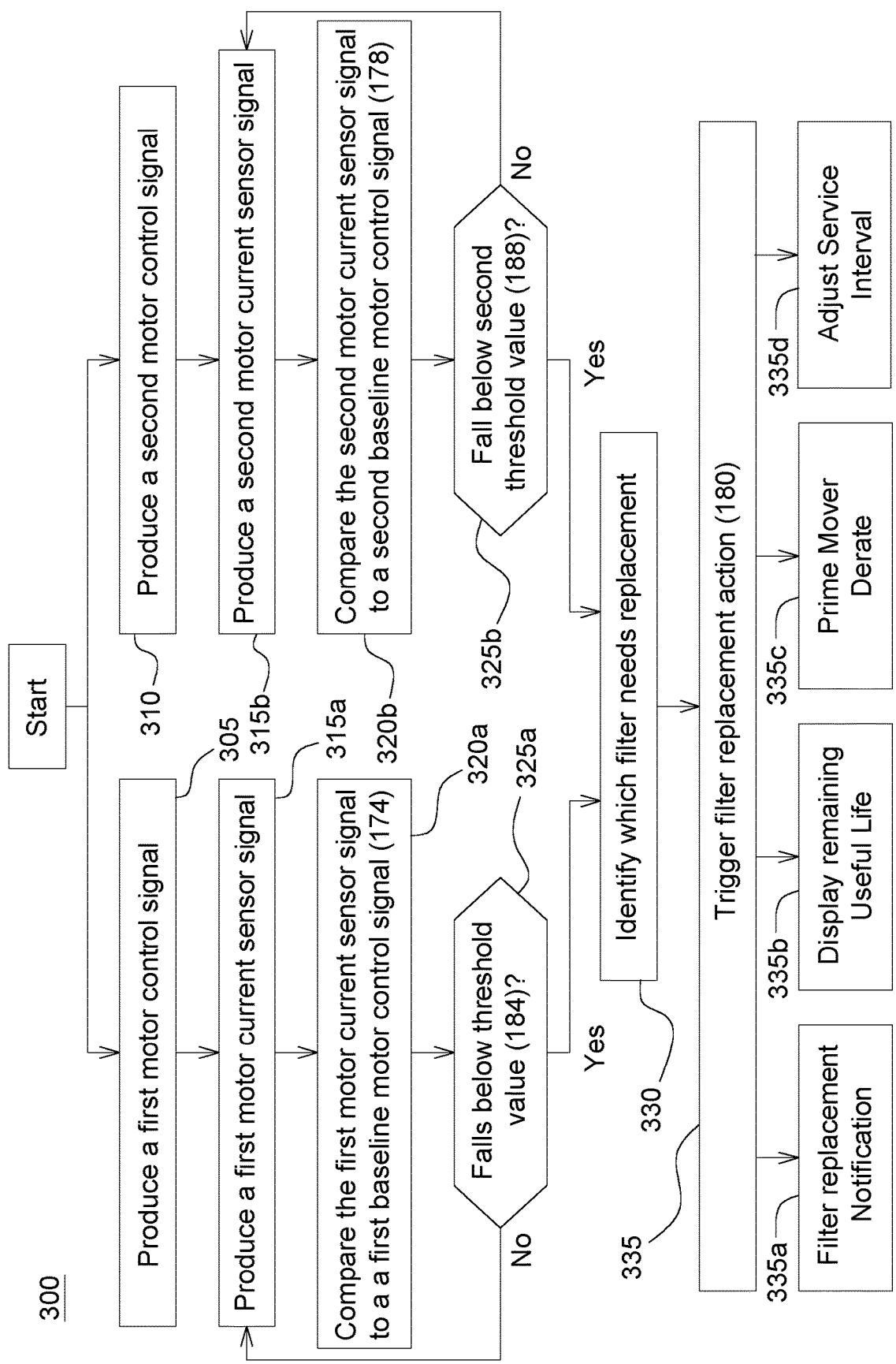
FIG. 3 depicts a flow chart of steps in an embodiment of a method for monitoring the condition of an air filter.

Now turning to FIG. 3, with continued reference to FIGS. 1 and 2, the air filter monitoring system 110 also includes a non-transitory computer readable medium comprising a program instruction for permitting a controller 165 to monitor the HVAC system 100. The program instruction, when executed, comprises causing a processor 170 of the controller 165 to do the following steps. The processor 170 produces the first 144 and the second motor control signal 148 to drive independently the pressurization blower 130 and the recirculation blower 132, respectively. The first motor control signal 144 is a function of the first speed sensor signal 156 to maintain a constant speed from the pressurization blower 130 to the outlet 140 despite changes in the condition of the fresh air filter 120. The second motor control signal 148 is a function of the speed select signal to maintain a constant speed from the recirculation blower to the outlet 140 despite changes in the condition of the recirculation air filter 122. The processor 170 monitors the first motor current sensor signal 147 and second motor current sensor signals 151 (i.e. the processor 170 monitors the current, voltage or amp draw of each). Monitoring may include a continuous monitoring, periodic sampling, or an operator-initiated test sampling. The processor 170 then compares the first motor current sensor signal 147 to a first baseline motor current sensor signal 174 and the second motor current sensor signal 151 to a second baseline motor current sensor signal 178. The processor 170 triggers a filter replacement action 180 when the first motor current sensor signal 147 fall below a first threshold value 184 of the first baseline motor current sensor signal 174 or if the second motor current sensor signal 151 falls below a second threshold value 188 of the second baseline motor current sensor signal 178. The first threshold value 184 and the second threshold value 188 may be based on a desired contaminate capacity of each respective air filter to distinguish between an unclogged state and a clogged state. Threshold values identify a base value of the energization (motor control signals) required along a line used to detect the state of the air filters (120, 122). In one embodiment, the threshold value is a horizontal line. In another embodiment, the threshold value may vary based on various operating settings and conditions. In one particular embodiment, the second threshold value 188 (i.e. the threshold value of the second baseline motor current sensor signal used in maintaining a constant speed from the recirculation air blower 132 to the outlet 140) may depend on the speed select signal 152. The speed select signal permits the operator to select a desired operating speed for the recirculation blower 132.

In one embodiment, the first threshold value 184 may depend on a property of the fresh air 182. For example, certain environmental conditions may impact the type of wear on the HVAC system 100. Dust storms may cause dust to fill the air and increase the rate of particulate matter entering the system. Other weather elements may include direct exposure to heat, snow fall, or falling debris such leaves, small stones, or lightweight waste material. A property of fresh air 182 such as humidity, temperature, and particulate density may impact the first threshold value setting to increase or decrease the sensitivity of when to replace the fresh air filter. Similarly, the second threshold value 188 may depend on a property of air in the plenum 172.

The processor 170 then performs one or more actions (335a-d) based on the filter replacement action 180. The filter replacement action 180 may comprise of a display of one or more of a remaining useful life 335b, a filter replacement notification 335a, and a prime mover derate 335c. The remaining useful life 335b or adjustment of service intervals 335d may be based on a recording or prior measurements of baseline threshold values and timings of when the air filters were last replaced. This prognostic information could alert the operator before dirty air filters potentially cause issues with cab pressure and dust ingression in the HVAC system.

The first baseline motor current sensor signal 174 may be recalibrated when the fresh air filter 120 is replaced, and the second baseline motor current sensor signal 178 may be recalibrated when the recirculation air filter 122 is replaced.

The system 110 further comprises adjusting a fresh air filter service interval 198 for the fresh air filter 120 based on the first motor current sensor signal 147 and the recirculation air filter service interval 199 based on the second motor current sensor signal 151. Individual maintenance and control of the pressurization blower 130 and the recirculation blower 132 along with their respective filters, provides improved control of the environment within the operator cab 108. The system 100 enables control of the pressurization blower 130 so as to provide an essentially constant cubic feet per minute airflow output despite changes in the condition of the fresh air filter 120 and other attributes to changes in cab pressurization such as the operator opening the cab door.

FIG. 3 depicts a flow chart of steps in an embodiment of a method 300 for monitoring the condition of an air filter (120, 122). The HVAC system 100 includes a pressurization blower 130 having a first motor 142 for driving the pressurization blower 130, a recirculation blower 132 having a second motor 146 for driving the recirculation blower 132, a speed selector 150, a first motor current sensor 145, a second motor current sensor 149, and a non-transitory computer readable medium comprising a program instruction for permitting a controller 165 to monitor the HVAC system 100. In step 305, the method comprises producing a first motor control signal 144 to drive the pressurization blower 130. The first motor control signal 144 is a function of a speed is a function of a speed select signal 152 from the speed selector 150 to maintain a constant speed from the pressurization blower 130 to an outlet 140 despite changes in the condition of the fresh air filter 120. In step 310, the method 300 includes producing a second motor control signal 148 to drive the recirculation blower 132. The second motor control signal 148 is a function of the speed select signal to maintain a constant speed from the recirculation blower to the outlet despite changes in the condition of the recirculation air filter monitor. In steps 315a and 315b, the method includes monitoring the first motor current sensor signal 147 and the second motor current sensor signal 151. The method then, in step 320a, includes comparing the first motor current sensor signal 147 to a first baseline motor current sensor signal 174 and in step 320b includes comparing the second motor current sensor signal 151 to a second baseline motor current sensor signal 178. In steps 325a and 325b, a filter replacement action 180 is triggered when the first motor current sensor signal 147 signal falls below a first threshold value 184 of the first baseline motor current sensor signal 174, or the second motor current sensor signal 151 falls below a second threshold value 188 of the second baseline motor current sensor signal 178. The method 300 then includes identifying which filter needs replacement in step 330. In a final step 335, the method 300 includes performing one or more actions based on the filter replacement action 180. This may include a filter replacement notification 335*a*, displaying the remaining useful life 335*b*, derating the prime mover 335*c*, and adjusting the service interval 335*d*.

What is claimed is:

1. An air filter monitoring system for a work machine, the air filter monitoring system comprising:
 a plenum having a fresh air intake through which a fresh air is drawn into the plenum, a recirculation air intake through which cab air is drawn from the cab into the plenum, and an outlet through which air is exhausted into the cab;
 a pressurization blower between the fresh air intake and the outlet for causing airflow from the fresh air intake to the outlet;
 a first motor for driving the pressurization blower as a function of the first motor control signal, the first motor control signal at a first motor speed;
 a first motor current sensor for measuring a first current to maintain the first motor speed, the first motor current sensor providing a first motor current sensor signal indicative of the first current;
 a recirculation blower between the recirculation air intake and the outlet for causing airflow from the recirculation air intake to the outlet;
 a second motor for driving the recirculation blower as a function of a second motor control signal, the second motor control signal at a second motor speed;
 a second motor current sensor for measuring a second current to maintain the second motor speed, the second motor current sensor providing a second motor current sensor signal indicative of the second current;
 a speed selector for providing a speed select signal;
 a fresh air filter for filtering air flowing from the fresh air intake to the pressurization blower;
 a recirculation air filter for filtering cabin air flowing from the recirculation air intake to the outlet;
 a pressurization blower speed sensor for providing a first speed sensor signal indicative of a speed of the pressurization blower, wherein the speed of the pressurization blower varies as a function of an airflow from the pressurization blower;
 a recirculation blower speed sensor for providing a second speed signal indicative of the speed of the recirculation blower, wherein the speed of the recirculation blower varies as a function of the speed select signal; and
 a non-transitory computer readable medium comprising a program instruction for permitting a controller to monitor the HVAC system, the program instruction when executed comprising causing a processor of the controller to:
  produce a first and a second motor control signals to drive independently the pressurization blower and the recirculation blower, respectively, the first motor control signal being a function of the first speed sensor signal to maintain a constant speed from the pressurization blower to the outlet despite changes in the condition of the fresh air filter and the second motor control signal being a function of the speed select signal to maintain a constant speed from the recirculation blower to the outlet despite changes in the condition of the recirculation air filter monitor;
  monitor the first motor current sensor signal and the second motor current sensor signal;
  compare the first motor current sensor signal to a first baseline motor current sensor signal and the second motor current sensor signal to a second baseline motor current sensor signal; and
  trigger a filter replacement action identifying the filter requiring replacement when the first motor current sensor signal falls below a first threshold value of the first baseline motor current sensor signal or the second motor current sensor signal falls below a second threshold value of the second baseline motor current sensor signal.

2. The air filtering monitoring system of claim 1, wherein the second threshold value depends on the speed select signal.

3. The air filter monitoring system of claim 1, wherein the second threshold value depends on a property of air in the plenum.

4. The air filter monitoring system of claim 1, wherein the first threshold value depends on a property of the fresh air wherein the property comprises one of humidity, temperature, and particulate density.

5. The air filter monitoring system of claim 1, wherein the filter replacement action comprises one or more of a display of a remaining useful life, a filter replacement notification, and a prime mover derate.

6. The air filter monitoring system of claim 5, wherein the remaining useful life is based on a recording of prior measurements of baseline threshold values and timings of air filter replacements.

7. The air filter monitoring system of claim 1, wherein the first baseline motor current sensor signal is recalibrated when the fresh air filter is replaced, and the second baseline motor current sensor signal is recalibrated when the recirculation air filter is replaced.

8. The air filter monitoring system of claim 1 wherein the filter replacement action comprises adjusting a fresh air filter service interval for the fresh air filter based on the first motor control signal, and the recirculation air filter service interval based on the second motor control signal.

9. A method of monitoring a fresh air filter through which fresh air enters a plenum and a recirculation air filter through which recirculated air enters the plenum in a work machine HVAC system, wherein the HVAC system includes a pressurization blower having a first motor for driving the pressurization blower, a recirculation blower having a second motor for driving the recirculation blower, a speed selector, and a non-transitory computer readable medium comprising a program instruction for permitting a controller to monitor the HVAC system, the method comprising:
 producing a first motor control signal to drive the pressurization blower at a first motor speed, the first motor control signal being a function of a speed select signal from the speed selector to maintain a constant speed from the pressurization blower to an outlet despite changes in the condition of the fresh air filter;
 producing a second motor control signal to drive the recirculation blower at a second motor speed, the second motor control signal being a function of the speed select signal to maintain a constant speed from the recirculation blower to the outlet despite changes in the condition of the recirculation air filter monitor;
 producing a first motor current sensor signal by a first motor current sensor, the first motor current sensor measuring a first current to maintain the first motor speed;

producing a second motor current sensor signal by a second motor current sensor, the second motor current sensor measuring a second current to maintain the second motor speed;

comparing the first motor current sensor signal to a first baseline motor current sensor signal and the second motor current sensor signal to a second baseline motor current sensor signal;

identifying which filter requires replacement based on the first motor control signal and the second motor control signal; and triggering a filter replacement action when the first motor current signal falls below a first threshold value of the first baseline motor current sensor signal or the second motor current sensor signal falls below a second threshold value of the second baseline motor current sensor signal.

10. The method of claim 9, wherein the second threshold value depends on the speed select signal.

11. The method of claim 9, wherein the second threshold value depends on a property of air in the plenum.

12. The method of claim 9, wherein the first threshold value depends on a property of the fresh air wherein the property comprises one of humidity, temperature, and particulate density.

13. The method of claim 9, wherein the filter replacement action comprises a fresh air filter replacement action when the first motor current sensor signal falls below the first threshold value, and a recirculation air filter replacement action when the second motor current sensor signal falls below the second threshold value.

14. The method of claim 9, wherein the filter replacement action comprises a display of one or more of a remaining useful life, a filter replacement notification, and a prime mover derate.

15. The method of claim 9, wherein one or more of the first baseline motor current sensor signals is calibrated when one or more of the fresh air filter and the recirculation air filter is replaced.

16. The method of claim 9 further comprising adjusting a fresh air filter service interval for the fresh air filter based on the first motor control signal and the recirculation air filter service interval based on the second motor control signal.

17. A non-transitory computer readable medium comprising a program instruction for permitting a controller to monitor the air filters on an HVAC system of a work machine, the program instructions when executed comprising causing a processor of the controller to:

produce a first motor control signal to drive the pressurization blower at a first motor speed, the first motor control signal being a function of a first speed sensor signal to maintain a constant speed from the pressurization blower to an outlet despite changes in the condition of a fresh air filter;

produce a second motor control signal to drive the recirculation blower at a second motor speed, the second motor control signal being a function of the speed select signal to maintain a constant speed from the recirculation blower to the outlet despite changes in the condition of the recirculation air filter monitor;

producing a first motor current sensor signal by a first motor current sensor, the first motor current sensor measuring a first current to maintain the first motor speed;

producing a second motor current sensor signal by a second motor current sensor, the second motor current sensor measuring a second current to maintain the second motor speed;

compare the first motor current sensor signal to the second motor current sensor signal; and trigger a filter replacement alert when a difference between the first motor current sensor signal and the second motor current sensor signal exceed a threshold value;

identify which filter requires replacement based on the first motor current sensor signal and the second motor current sensor signal; and perform a filter replacement action based on the filter replacement notification.

18. The program instructions of claim 17, wherein the threshold value depends on one or more of the speed select signal and a property of an air in a plenum of the HVAC system.

19. The program instructions of claim 17, wherein the filter replacement action comprises a display of one or more of a remaining useful life, a filter replacement notification, and a prime mover derate.

20. The program instruction of claim 17, wherein the filter replacement action comprises a fresh air filter replacement based on the first motor current sensor signal, and a recirculation air filter replacement based on the second motor current sensor signal.

* * * * *